UNITED STATES PATENT OFFICE.

CARLETON ELLIS, OF LARCHMONT, NEW YORK, ASSIGNOR TO ELLIS-FOSTER COMPANY, A CORPORATION OF NEW JERSEY.

STEEL-PRESERVATIVE PAINT.

943,670.   Specification of Letters Patent.   Patented Dec. 21, 1909.

No Drawing.   Application filed May 7, 1909. Serial No. 494,702.

*To all whom it may concern:*

Be it known that I, CARLETON ELLIS, a citizen of the United States, residing at Larchmont, in the county of Westchester and State of New York, have invented certain new and useful Improvements in Steel-Preservative Paint, of which the following is a specification.

This invention relates to preservative compositions for protecting structures of iron and steel and relates particularly to compositions containing a rust inhibiting body.

It has been observed that chromic acid and chromates are to a considerable degree inhibitors of rust if these compounds are used in a chemically pure state, but it has been found that from the practical point of view, the products of commercial purity available are not on the whole satisfactory inhibitors, owing to the presence of certain impurities which offset in a large measure the protective influence of chromic acid and its compounds.

It is the object of my invention in making use of such inhibiting compounds to combine therewith certain neutralizing agents which render the action of the impurities of these chromic compounds practically negligible.

I have found that the addition to the chromic material of a small amount of a finely powdered metallic body such as zinc, aluminum or iron overcomes the action of the aforesaid impurities.

In the preparation of my improved composition, I preferably employ as the basis, sublimed white lead or sulfate of lead and particularly that form known as blue sublimed lead which probably contains some metallic lead. With this material, I incorporate a suitable chromate preferably chromate of zinc and a still smaller amount of metallic zinc, aluminum or iron. In the latter case, I prefer to use a very finely powdered iron which is known as alcoholized iron. Graphite in its various forms, such as flake graphite or gangue graphite carrying silica and other mineral matter may also be added, as of course, other paint bases such as ordinary white lead, whiting, gypsum, barytes, silex, clay and the like, also various pigments such as Prussian blue, chrome yellow, Brunswick green, lampblack, etc.

A suitable composition illustrating my invention consists of blue sublimed white lead 50 pounds, zinc chromate 10 pounds, graphite 10 pounds, powdered metallic zinc 5 pounds, linseed oil 40 pounds, Chinese wood oil 10 pounds, Japan drier 3 pounds, turpentine 3 pounds.

Another illustrative formula consists of blue sublimed white lead 35 pounds, zinc oxid 10 pounds, "carbonate of lime borax waste" 10 pounds, zinc chromate 7 pounds, alcoholized iron 3 pounds, linseed oil 40 pounds, turpentine 10 pounds.

Still another illustrative formula consists of white lead 40 pounds, copper chromate 5 pounds, lead chromate 5 pounds, metallic zinc 5 pounds, graphite 5 pounds, barytes 10 pounds, silex 5 pounds, linseed oil 50 pounds, petroleum naphtha of a flash point of 110° F. 10 pounds.

Various other oils and drying compositions may be employed besides those above set forth, as for example, rosin oil, gloss oil, corn oil and the like may be used to a more or less degree in lieu of linseed oil; also resins such as copal or bitumens such as asphalt. Such thinning materials as gasolene or light petroleum naphtha, benzol, solvent naphtha, rosin spirits, wood turpentine, pine oil and the like may be used.

The protective action of the paint is enhanced by the addition of a small amount of oil-soluble-copper such as copper oleate, and in the above compositions, if desired from 1% to 3% copper oleate may be introduced. This may be made satisfactorily and cheaply by melting 5 pounds of rosin, 14 pounds of commercial oleic acid and raising the temperature to 140° C. when 4 to 5 pounds of copper carbonate are gradually added. When effervescence has ceased, the composition may be thinned with linseed oil or other thinning material to make a vehicle carrying from 1 to 3% of this oil soluble copper body.

By the combination of the above ingredients, a composition is secured which protects iron and steel from corrosion for a very long period of time, even when subject to extreme surface conditions as the composition is very resistant to the action of moisture, carbon dioxid and sulfurous gases; this is particularly the case when blue sublimed white lead and a small proportion of Chinese wood oil is used, as the former is not affected by sulfurous gases and the latter has a very pronounced water-proofing effect.

With larger proportions of Chinese wood oil than those above specified, it is possible even to make use of a quantity of gloss oil in the oil vehicle as the wood oil has the effect of hardening soft resins such as rosin or rosin containing lime resinate to such an extent that the action of the moisture is not appreciable in such compositions.

To recapitulate: My invention consists in a composition carrying a rust inhibiting compound preferably a chromate body and a neutralizing compound to overcome the effect of impurities present in said inhibiting compound which neutralizing body is preferably a finely powdered metallic substance and a paint basis preferably blue sublimed white lead owing to its inertness to the action of sulfurous and sulfuric acid gases and its property of having no saponifying action on the oil vehicle, in combination if desired, with other suitable coloring or pigmentary bodies and with or without graphite, all in conjunction with a vehicle ordinarily composed largely of linseed oil and preferably containing a modicum of Chinese wood oil and a thinning agent.

Having described my invention to the details of which I do not wish to limit myself, what I claim is:—

1. An iron preservative composition consisting of blue sublimed white lead, zinc chromate, zinc dust, graphite, linseed oil, wood oil and a thinning agent.

2. An iron preservative composition comprising blue sublimed white lead, a chromic acid compound, a neutralizer for the impurities therein, and a paint vehicle.

3. An iron preservative composition comprising zinc chromate, zinc dust, and a paint vehicle of an oily character.

4. An iron preservative composition comprising a white lead basis, a chromic acid rust inhibiting compound, a metallic body as a neutralizer for the impurities therein and an oily paint vehicle.

5. An iron preservative composition comprising blue sublimed white lead, a salt of chromic acid, a neutralizing agent for the impurities therein and a paint vehicle consisting largely of linseed oil.

6. An iron preservative composition comprising blue sublimed white lead, a chromic acid body, a neutralizing agent for the impurities therein, linseed oil and wood oil.

In testimony whereof I have affixed my signature in presence of two witnesses.

CARLETON ELLIS.

Witnesses:
NATHANIEL L. FOSTER,
FRANCES I. NEWMAN.